United States Patent [19]

Bach

[11] Patent Number: 4,769,558
[45] Date of Patent: Sep. 6, 1988

[54] INTEGRATED CIRCUIT CLOCK BUS LAYOUT DELAY SYSTEM

[75] Inventor: Randall E. Bach, Stillwater, Minn.

[73] Assignee: ETA Systems, Inc., Minn.

[21] Appl. No.: 883,829

[22] Filed: Jul. 9, 1986

[51] Int. Cl.[4] .......................... H03K 5/13; H03K 3/26
[52] U.S. Cl. .................................... 307/269; 307/303; 307/602
[58] Field of Search ............... 307/269, 452, 453, 303, 307/602, 303.1

[56] References Cited

U.S. PATENT DOCUMENTS

| | | | |
|---|---|---|---|
| 3,171,981 | 3/1965 | Wolterman | 307/88.5 |
| 3,418,498 | 12/1968 | Farley | 307/293 |
| 3,633,113 | 1/1972 | Grubel | 328/29 |
| 3,725,793 | 4/1973 | Phillips | 328/63 |
| 3,753,012 | 8/1973 | Frederiksen et al. | 307/293 |
| 4,208,724 | 6/1980 | Rattlingourd | 364/900 |
| 4,241,418 | 12/1980 | Stanley | 364/900 |
| 4,321,687 | 3/1982 | Parsons et al. | 364/900 |
| 4,412,342 | 10/1983 | Khan et al. | 375/107 |
| 4,414,637 | 11/1983 | Stanley | 364/569 |
| 4,419,739 | 12/1983 | Blum | 364/900 |
| 4,447,876 | 5/1984 | Tague et al. | 364/200 |
| 4,479,216 | 10/1984 | Krambeck et al. | 371/61 |
| 4,482,826 | 11/1984 | Ems et al. | 307/602 |
| 4,507,574 | 3/1985 | Seki et al. | 307/453 |
| 4,523,106 | 6/1985 | Tanizawa et al. | 307/303 |
| 4,572,572 | 2/1986 | Shoji | 307/453 |
| 4,639,615 | 1/1987 | Lee et al. | 307/269 |

*Primary Examiner*—Stanley D. Miller
*Assistant Examiner*—B. P. Davis
*Attorney, Agent, or Firm*—Kinney & Lange

[57] ABSTRACT

A clock bus system fabricated on an integrated circuit for distributing a train of clock pulses to circuit elements on the integrated circuit. An input terminal is connected to receive a train of clock pulses. All of the circuit elements are circumscribed by a clock bus which is also coupled to each of the circuit elements. A plurality of distribution legs which include clock bus drivers are coupled to the input terminal by conductors and provide the train of clock pulses to the clock bus at spaced-apart locations. The distribution legs coupled to the input terminal by shorter conductors include delay elements for delaying the clock pulse train by time periods corresponding to the delay inherent in longer conductors. The clock pulse trains provided to the clock bus by the distribution legs are thereby synchronized with respect to each other.

6 Claims, 1 Drawing Sheet

INTEGRATED CIRCUIT CLOCK BUS LAYOUT DELAY SYSTEM

BACKGROUND OF THE INVENTION

1. Field of the Invention

The present invention is a clock bus system for use on very large-scale integrated (VLSI) circuits.

2. Description of the Prior Art

Modern digital computers are formed by hundreds of thousands and even millions of logic elements. In computer architectures which are highly integrated, these logic elements are fabricated on very large-scale integrated (VLSI) circuit chips known as gate arrays. The gate arrays themselves are organized onto a plurality of major function circuit boards which are dedicated to the performance of specific tasks. A supercomputer, for example, can include a central processing unit (CPU), memory interface, and input/output (I/O) major function circuit boards. Each of these circuit boards will typically be formed by hundreds of gate arrays.

In order to achieve a high data throughput, operations are distributed throughout the computer and performed in "parallel." Processed data and microinstructions are communicated between individual gate arrays and between major function circuit boards. It is extremely important, therefore, that all microinstructions and data transfers executed by the gate arrays be synchronized with those of other gate arrays. To this end, the computer includes a central clock distribution system for providing a clock signal in the form of a synchronized train of clock pulses to all gate arrays. A clock system of this type is disclosed in an application entitled "Electronic Clock Tuning System", Ser. No. 06/814,654, filed Dec. 30, 1985, and assigned to the same assignee as the present invention.

Once the clock signal is received from the central clock distribution system, a clock bus system on each gate array distributes the clock signal to each individual circuit element. For the very same reasons that each gate array must receive synchronized clock signals from the central clock distribution system, it is imperative that each circuit element on the gate array receive a synchronized train of clock pulses from the clock bus system.

Even minute discrepancies between the phases of clock pulse trains arriving at different circuit elements on a gate array can have disastrous consequences on computer operation. These discrepancies, or skews, are the product of numerous factors. Possibly the most significant factor contributing to skews introduced by the clock bus system are differing conductor path lengths between the terminal on the gate array at which the clock signal is received from the clock distribution system, and the individual circuit elements. Other factors such as operating temperature, supply voltage, component tolerance, and variables due to manufacturing processes also contribute to skew between the clock pulse trains.

The higher the frequency of the clock pulse train, the faster the computer can process data. Frequency of the clock pulse train, however, is limited by the uncertainty, or maximum skew, introduced between clock pulse trains supplied to various circuit elements on the gate array. Simply put, computer performance can be greatly increased by reducing skews introduced by the clock bus system.

Presently, little attention is paid to reducing the skews introduced by clock bus systems. One reason for this lack of attention is the fact that commonly used integrated circuits are relatively small, with the physical distance between the terminal on the circuit at which the clock signal is received, and all circuit elements thereon which require the clock signal, is relatively short. Small differences in length between the conductors therefor introduce little skew.

In one common clock bus system, the clock signal is branched out to all circuit elements on the gate array through a tree-type network formed by a plurality of buffers. The network is made large enough to provide a clock signal to each circuit element which requires it. Still another prior art clock bus structure includes a clock bus which circumscribes all circuit elements on the gate array. Although this clock bus structure permits shorter interconnections between the clock bus and individual circuit elements, delays are introduced by the clock bus itself.

It is evident that there is a continuing need for improved clock bus structures for VLSI circuits. As the size of these circuits continues to increase, the distance between the terminal on the integrated circuit at which the train of clock pulses is received, and each of the circuit elements, can vary widely enough to introduce skews which detract from computer performance. The clock bus system must be capable of providing synchronized trains of clock pulses to all circuit elements on the integrated circuit.

SUMMARY OF THE INVENTION

The present invention is a clock bus system for distributing a train of clock pulses to a plurality of circuit elements. A train of clock pulses is received by input means. Clock bus means for propagating the train of clock pulses substantially circumscribe the circuit elements. Each circuit element is coupled to the clock bus means. A plurality of distribution leg means are coupled to the input means by conductors, and provide the train of clock pulses to the clock bus means at spaced-apart locations.

In preferred embodiments, the clock bus system is fabricated on an integrated circuit. Each distribution leg means also includes a clock bus driver. The conductors which couple the distribution leg means to the input means delay the clock pulse train by conductor delay periods, and at least some of the conductor delay periods differ. At least some of the distribution leg means include delay means for delaying the clock pulse trains by predetermined time periods. The predetermined time periods of the delay means of each distribution leg correspond to a difference between a greatest conductor delay period, and the conductor delay period of the particular distribution leg means.

The clock bus system is well suited for fabrication on very large-scale integrated circuits used as components of supercomputers. Since the clock bus circumscribes all circuit elements, it can be coupled to the circuit elements by conductors of relatively uniform length, thereby reducing clock bus-to-circuit element skews. The clock bus is also driven at several spaced-apart locations by synchronized clock pulse trains. Skews introduced by the clock bus itself are therefore reduced increasing overall computer performance.

DETAILED DESCRIPTION OF THE PREFERRED EMBODIMENTS

Figure 1:
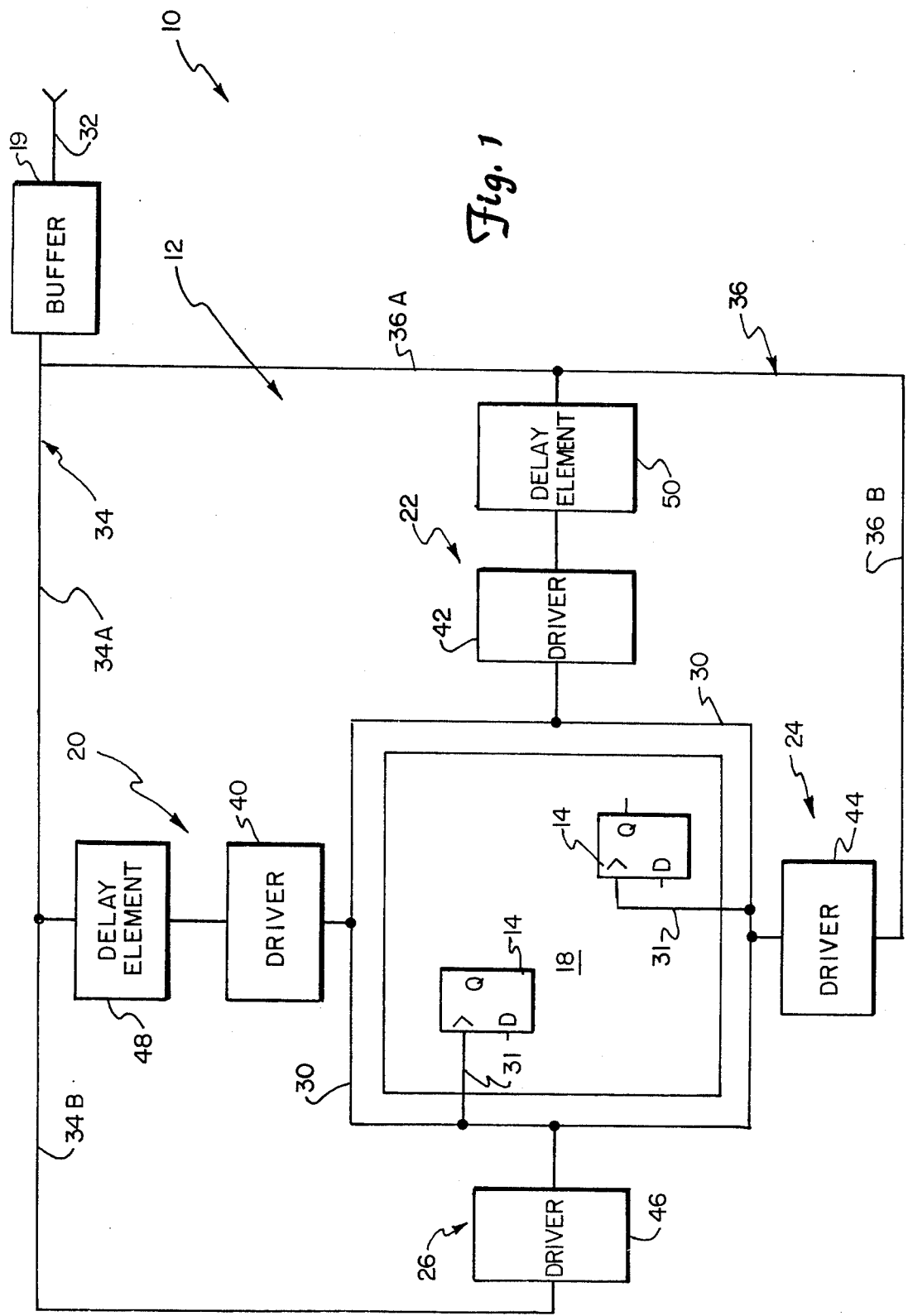
FIG. 1 is a block diagram representation of the clock bus system of the present invention.

An integrated circuit 10 which includes clock bus system 12 of the present invention is illustrated generally in FIG. 1. A plurality of circuit elements 14 (flip-flops are shown for purposes of example) are fabricated on a main body portion 18 of integrated circuit 10 in accordance with any known circuit technology. In one embodiment, clock bus system 12 is fabricated on a 20K CMOS gate array.

Clock bus system 12 includes buffer 19, a plurality of distribution legs 20, 22, 24, and 26, and clock bus 30. Clock bus system 10 provides synchronized system clock signals in the form of trains of clock pulses to circuit elements 14. Clock bus 30 is a conductor such as metal foil which substantially surrounds, or circumscribes, all circuit element 14 which require a system clock signal. In the embodiment shown in FIG. 1, clock bus 30 is rectangular in shape, closed, and completely circumscribes body portion 18 of integrated circuit 10. Clock bus 30 has an extended length, and is typically positioned near the periphery of integrated circuit 10. The term "substantially" is used to characterize the term "circumscribe" since a clock bus 30 which is open and surrounds less than all of circuit elements 14 does not technically circumscribe the circuit elements, yet provides most all of the advantages of that shown in FIG. 1. Clock bus 30 need only provide a convenient point of interconnection to circuit elements from several sides of body portion 18.

All circuit elements 14 on integrated circuit 10 which require a system clock signal have their clock terminal (indicated by a sideways "v" on the flip-flops) coupled to receive the system clock signal from clock bus 30 by conductors 31. Since clock bus 30 circumscribes circuit elements 14, they are all physically located near at least one side of clock bus 30. Short conductors 31 of relatively uniform length can therefore be used to interconnect circuit elements 14 to clock bus 30. Skews introduced by conductors 31 are thereby kept to a minimum.

A train of clock pulses provided by a central clock distribution system such as that described in an application entitled "Electronic Clock Tuning System", Ser. No. 06/814,654, which is assigned to the same assignee as the present invention, is coupled to integrated circuit 10 through input terminal 32 and applied to buffer 19. Buffer 19 isolates other elements of clock bus system 12 from the central clock distribution system.

Distribution legs 20, 22, 24, and 26 are coupled to receive the clock pulse train from buffer 19, and supply the clock pulse train to clock bus 30 at several spaced-apart locations. In the embodiment shown in FIG. 1, the clock pulse train is coupled to distribution legs 20 and 26 by conductor 34, with conductor section 34A interconnecting buffer 19 and distribution leg 20, and the conductor section 34B coupling conductor section 34A to distribution leg 26. In a similar manner, conductor 36 has a first section 36A which couples buffer 19 to distribution leg 22, and a second section 36B which interconnects conductor section 36A to distribution leg 24.

In the embodiment shown in FIG. 1, distribution legs 20, 22, 24, and 26 each supply the clock pulse train to points on clock bus 30 which are equidistant from one another, and spaced ninety degrees apart. Distribution legs 20, 22, 24 and 26 preferably include drivers 40, 42, 44, and 46, respectively. Drivers 40–46 are common circuit elements which convert the electrical characteristics of the clock pulse train received from buffer 19 to those required to drive all circuit elements 14 on integrated circuit 10. In one embodiment, drivers 40–46 are programmable devices, the load drive capability of which can be adjusted depending upon whether clock bus 30 is heavily or lightly loaded by circuit elements 14.

The physical distance between distribution legs 20, 22, 24, and 26 and buffer 19 differs since some of these distribution legs are located on integrated circuit 10 at points more distant from buffer 19 than others. Clock pulses which are provided to distribution leg 26, for example, must be propagated through conductor sections 34A and 34B, while the clock pulses provided to distribution leg 20 are propagated only through conductor section 34A. As a result of inherent delays associated with the additional lengths of conductor sections 34B and 36B, the clock pulse trains supplied to clock bus 30 through distribution legs 24 and 26 would be skewed with respect to those provided by distribution legs 20 and 22. To compensate for these delays, at least some of distribution legs 20, 22, 24 and 26 of clock bus system 12 include delay elements to insure minimum skew between the clock pulse trains provided by these distribution legs to clock bus 30.

In the embodiment shown in FIG. 1, conductor sections 34A and 36A are fabricated in such a manner that they have nearly identical lengths. The clock pulse trains provided to by distribution legs 20 and 22 will therefore both be delayed by the same amount of time, and be synchronized with respect to each other. Conductor sections 34B and 36B are also nearly identical in length. As a result, the clock pulse trains provided to distribution legs 24 and 26 will also be synchronized with respect to each other, although these clock pulse trains will be skewed with respect to those provided to distribution legs 20 and 22 due to the additional propagation delay of conductor sections 34B and 36B.

To compensate for the delay or skew introduced by conductor sections 34B and 36B, distribution legs 20 and 22 include delay elements 48 and 50, respectively. Delay elements 48 and 50 delay the clock pulse trains provided to clock bus 30 by distribution legs 20 and 22, respectively, by a delay period equal to the propagation delay, or conductor delay period, of conductor sections 34B and 36B. Delay elements 48 and 50 therefore delay the clock pulse trains provided to distribution legs 20 and 22, respectively, by time periods corresponding to a difference between the delay imposed by the longest conductor (both sections A and B of conductors 34 and 36) and the delay imposed by conductor sections 34A and 36B which couple distribution legs 20 and 22, respectively, to buffer 19. In one preferred embodiment, delay elements 48 and 50 are comprised of resistors which together with the input capacitance of drivers 40 and 42, respectively, function as RC networks and delay the clock pulse trains by the desired period. The clock pulse trains provided to clock bus 30 by distribution legs 20–26 will therefore all be synchronized with respect to each other.

In one embodjment of the present invention, delay elements 48 and 50 both delay the clock pulse train received thereby by approximately 300 picoseconds to compensate for the propagation delay of conductor sections 34B and 36B, respectively. Skews between clock pulse trains provided to clock bus 30 by distribution legs 20–26 can be kept to within 200 picoseconds. Skews between clock bus 30 and circuit elements 14 caused by conductors 31 can be kept to within 200–300 picoseconds. As a result, skews between the clock pulse trains provided to circuit elements 14 can be reduced to 400–500 picoseconds using clock bus system 12. This is an improvement of 600–1200 picoseconds over that of prior art techniques implemented on an integrated circuit with a similar clock frequency. This improvement amounts to approximately 5%–10% of the system clock period.

Although the present invention has been described with reference to preferred embodiments, workers skilled in the art will recognize that changes may be made in form and detail without departing from the spirit and scope of the invention.

What is claimed is:

1. An integrated circuit, including:
   terminal means for receiving a train of clock pulses;
   a plurality of circuit elements;
   clock bus means substantially circumscribing the circuit elements for propagating the train of clock pulses, wherein the circuit elements are coupled to the clock bus means;
   a plurality of distribution legs, each coupling the train of clock pulses to the clock bus means at spaced-apart locations;
   conductors coupling the distribution legs to the terminal means, each conductor characterized by a conductor delay period, and wherein at least some of the conductor delay periods differ; and
   delay means associated with each of at least some of the distribution legs, for delaying the clock pulse train by a predetermined time delay period, wherein the predetermined time delay period of the delay means corresponds to a difference between a greatest conductor delay period and the conductor delay period of the conductor coupling the clock pulse train to the distribution leg with which the delay means is associated.

2. The integrated circuit of claim 1 wherein the clock bus means is closed and completely circumscribes the circuit elements.

3. The integrated circuit of claim 1 wherein the plurality of distribution legs consist of first, second, third, and fourth distribution legs coupling the train of clock pulses to the clock bus means at locations spaced apart by approximately 90°.

4. The integrated circuit of claim 13 wherein:
   the conductors consist of a first conductor coupling the first distribution leg to the terminal means, a second conductor coupling the second distribution leg to the terminal means, a third conductor coupling the third distribution leg to the second distribution leg, and a fourth conductor coupling the fourth distribution leg to the first distribution leg;
   the first and second conductors are approximately equal in length;
   the third and fourth conductors are approximately equal in length; and
   the delay means of the first and second distribution legs delay the clock pulse train by a delay period corresponding to a delay inherent in the third and fourth conductors.

5. The integrated circuit of claim 1 wherein each distribution leg includes a clock bus driver.

6. The integrated circuit of claim 1 wherein the distribution means includes clock bus drivers.

* * * * *

UNITED STATES PATENT AND TRADEMARK OFFICE
CERTIFICATE OF CORRECTION

PATENT NO. : 4,769,558

DATED : September 6, 1988

INVENTOR(S) : Randall E. Bach

It is certified that error appears in the above-identified patent and that said Letters Patent is hereby corrected as shown below:

Column 6, line 15, delete "claim 13" and insert--claim 3--.

Signed and Sealed this

Seventeenth Day of January, 1989

Attest:

DONALD J. QUIGG

*Attesting Officer*  *Commissioner of Patents and Trademarks*